Patented Jan. 21, 1930

1,744,547

UNITED STATES PATENT OFFICE

ALEXANDER HASSELBACH, OF DESSAU, GERMANY, ASSIGNOR TO THE FIRM G. POLYSIUS, OF DESSAU, GERMANY

REFRACTORY MATERIAL

No Drawing. Application filed February 26, 1926, Serial No. 90,988, and in Germany March 5, 1925.

This invention relates to a method of producing an easily hardening but difficultly fusible or highly refractory material, which is of utmost importance for various industries and which may be employed for instance for the lining of rotary kilns, chambers of dust coal furnaces and the like.

In practice it has been tried very often to produce a refractory material which will resist high temperatures. Up to now, however, it has not been possible to find such a material which permits charges of various kinds, as for instance aluminous cement or the like to be treated in the rotary kiln at high temperatures. The chief disadvantage of the linings employed in rotary kilns is, that said linings cannot offer sufficient resistance against the chemical or mechanical influences of the charge to be treated. Furnace- or kiln-linings and methods of producing refractory materials have been proposed, which mainly consisted of natural or artificial corundum and Portland cement, lime or gypsum. In practice however linings of this kind have failed, as at the places of contact of the heated kiln- or furnace-charge with the lining there will be chemical reactions, which after a short time tend to destroy the lining. This has been observed especially with the production of aluminous cement in the rotary kiln, in which the kiln charge melts at a temperature of about 1500° and in this condition easily tends to attack or injure the lining.

By tests and research work I have discovered a method of producing a difficultly fusible or highly refractory material, which is qualified in an exceptional manner for the lining of kilns, retort chambers of coal dust furnaces and the like, in which the charge to be treated is subjected to high temperatures or in which high temperatures are produced.

The essence of this novel method consists therein, that a material, having an exceptionally high fusing point is mixed with an aluminous cement, known as ciment fondu, and is burned with the same according to requirements. A material of this character is, for instance, granulated corundum. As an example I mix about 90 parts of corundum with 10 parts of highly aluminous cement and add some water. The mixture is pressed into moulds or applied directly as the lining of the rotary kiln or combustion chamber. It is then burned at a temperature of 1500 to 1600° C. for a period of two to three hours. As a result of this burning new chemical compositions of the two components (corundum and aluminous cement) are produced which offer the highest resistance against mechanical as well as chemical action. The corundum is aluminum oxide and may be made by fusing bauxite at a very high temperature of about 2000° C. and removing substantially all of the ingredients, such as iron oxide, which are prejudicial to the manufacture of a highly fireproof material. Corundum is not to be confused with calcined bauxite which is burned at only about a 1000° C. and still contains ten to twenty per cent of materials other than aluminum oxide and which reduce considerably the melting point and therefore the refractoriness. By a method of this kind a material of such hardness and power of resistance is produced as it is impossible to obtain with the employment of other known binding materials as for instance Portland cement, lime, gypsum or the like. This novel method furthermore has the important advantage, that it is suitable in equal manner for producing especially dense or also strongly porous material or stones in accordance with the use of a fine or coarse basic material.

An additional important feature consists in the surprisingly easy facility of binding between the above mentioned materials and the aluminous cement, which binding facility is intensively augmented by the burning, as the aluminous cement for instance with the corundum is transformed in novel and strongly resistant compounds at the melting of the cement.

It must be considered as a further advantage, that the production of the stones requires only a period of twentyfour hours for setting and hardening of the wetted mixture and for the burning and cooling. This is on account of the quick hardening and of the burning at a temperature, which lies above the melting point of the cement. Furthermore the burnt stones possess a very strong power of resistance against acid and alkaline agents and represent at the heating or cooling off respectively a perfectly homogeneous mass. The stones, produced from this mass, have after the burning a tensile strength of more than 120 kg. per sq. cm. and a compressive strength of more than 1200 kg. per sq. cm.

I claim:

The method of producing the highly refractory material which includes mixing corundum and a highly aluminous cement, and heating to a temperature above the fusing point of the cement.

In testimony whereof I affix my signature.

ALEXANDER HASSELBACH.